(12) United States Patent
Takaragi

(10) Patent No.: US 7,058,196 B2
(45) Date of Patent: Jun. 6, 2006

(54) APPARATUS AND METHOD FOR PROCESSING IMAGE AND COMPUTER-READABLE STORAGE MEDIUM

(75) Inventor: Yoichi Takaragi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,013

(22) Filed: Jan. 29, 1999

(65) Prior Publication Data

US 2002/0163671 A1   Nov. 7, 2002

(30) Foreign Application Priority Data

Jan. 30, 1998 (JP) ................... 10-019566

(51) Int. Cl.
*G06K 9/00* (2006.01)
*B41M 3/10* (2006.01)

(52) U.S. Cl. ..................... 382/100; 358/3.28

(58) Field of Classification Search ............ 382/100, 382/232; 358/450, 401, 501, 448, 1.14; 380/51, 380/54, 55; 283/74, 17, 113, 901; 399/366, 399/194, 182

See application file for complete search history.

(56) References Cited

U.S. PATENT DOCUMENTS 5,257,119 A * 10/1993 Funada et al. ............... 358/438
5,822,660 A * 10/1998 Wen .......................... 399/194

FOREIGN PATENT DOCUMENTS

JP    05-301380    11/1993
JP    06-086049    3/1994

* cited by examiner

*Primary Examiner*—Samir Ahmed
(74) *Attorney, Agent, or Firm*—Fitzpatrick, Cella, Harper & Scinto

(57) ABSTRACT

An image forming apparatus and method arranged to perform a process in which a copyright code is set as electronic watermark information in red, green, and blue image data obtained by a scanner, the image data is then transferred to a printer to undergo density conversion with respect to yellow, magenta, cyan, and black, and a printer serial number is set as electronic watermark information in the converted image data, followed by printing of the image data. This process facilitates discrimination of the two items of information.

27 Claims, 11 Drawing Sheets

APPARATUS AND METHOD FOR PROCESSING IMAGE AND COMPUTER-READABLE STORAGE MEDIUM

BACKGROUND OF THE INVENTION

1. Field of the Invention

The present invention relates to an image processing apparatus, an image processing method and a computer-readable recording medium.

2. Description of the Related Art

Recently, with the improvement of the performance of color copying machines and color printers, a technique for adding information to an image printed by a copying machine for the purpose of preventing unauthorized use of the copying machine has been put to practical use. Information added by the technique comprises, for example, a serial number of a copying machine.

A technique for marking an image with electronic watermark information, which is information about the copyright on the image or restriction of use of the image, has also been made public.

Methods for obtaining electronic watermark information will be explained.

As a method of converting a particular information such as a copyright code into electronic watermark information not easily recognizable with eye and superposing on an image the electronic watermark information, a method of mixing, for example, thin-yellow dots in an image according to such a particular information has been proposed. If a printer using binary dot formation instead of forming light and shade dots is used, a method of shifting a yellow dot by an odd or even dot pitch according to "1" or "0" of particular information may be used. A method of frequency-modulating image data according to particular information has also been proposed.

These methods are disclosed in Japanese Patent Laid-Open Publication 5-301380/1993, Japanese Patent Laid-Open Publication 6-86049/1994 and other documents.

Image data containing information such as a copyright code previously set as electronic watermark information may be printed by using a color printer. In such a case, according to the conventional art, information from which a copying machine serial number or the like can be ascertained is automatically added to the printed image. The electronic watermark information added to the original image is thereby disturbed. No means has been provided by considering this problem to ensure that information such as a copyright code will always be added in a discriminable form to printed matter.

This problem is encountered regardless of the kind of added information although only a copyright code and a machine serial number are mentioned above as added information.

SUMMARY OF THE INVENTION

An object of the present invention to provide an image processing apparatus, an image processing method and a computer-readable medium designed to solve the above-described problem.

Another object of the present invention to provide an image processing apparatus, an image processing method and a computer-readable medium designed to enable a process in which, when image data containing electronic water mark information is printed by a printer having a function of adding a machine serial number, the electronic watermark information can be printed in a recognizable condition.

To achieve these objects, according to one aspect of the present invention, there is provided an image processing apparatus comprising hiding means for forming second identification information not easily recognizable with eye and different in form from first identification information relating to a copyright and not easily recognizable with eye, the hiding means also for setting the second identification information in image data containing the first identification information.

According to another aspect of the present invention, there is provided an image processing method comprising a setting step including forming second identification information not easily recognizable with eye and different in form from first identification information relating to a copyright and not easily recognizable with eye, setting the second identification information in image data containing the first identification information.

Still another object of the present invention is to provide an image processing apparatus and method in which, in image data containing an item of information set so as not to be easily recognizable with eye, another item of information is set so to be easily readable afterward and so as not to be easily recognizable with eye.

A further object of the present invention is to provide a novel method, apparatus and computer-readable storage medium for setting information in image data so that the information is not easily recognizable with eye when the image of the image data is formed.

These and other objects, features and advantages of the present invention will become apparent from the following detailed description of the preferred embodiments of the present invention in conjunction with the accompanying drawings.

DESCRIPTION OF THE PREFERRED EMBODIMENTS

Embodiments of the present invention will be described below with reference to the accompanying drawings.

An example of a copying machine to which the present invention is applied will be described, but the present invention is not limited to it and can, of course, be applied to other various apparatuses.

Figure 1:
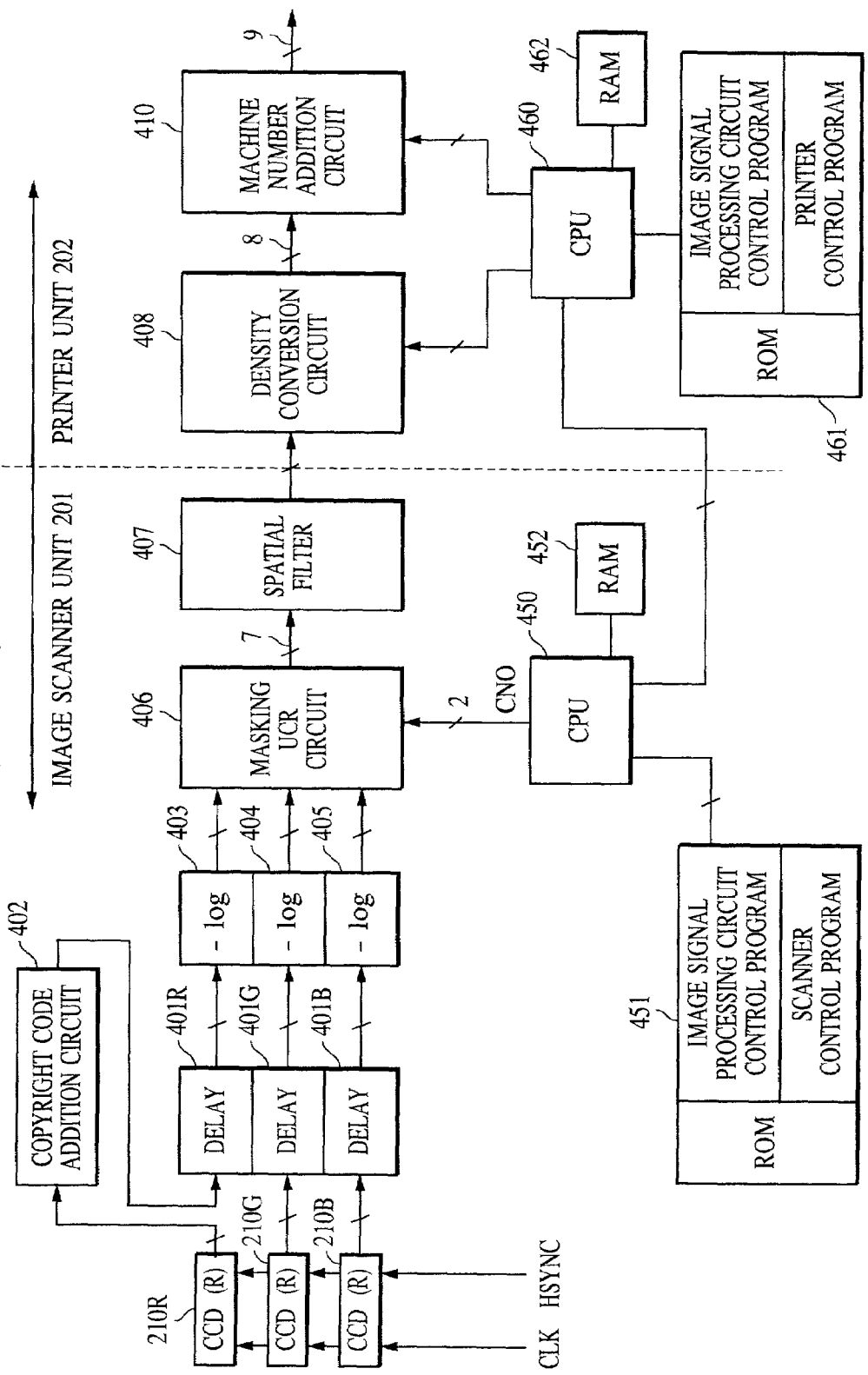
FIG. 1 is a block diagram showing the configuration of an image scanner unit and a printer unit of a first embodiment of the present invention.

FIG. 1 is a block diagram showing an image scanner unit 201 and a printer unit 202 of a copying machine which represents a first embodiment of the present invention.

Referring to FIG. 1, charge-coupled device (CCD) line sensors 210R, 210G, and 210B are provided, which have the same length as one side of a rectangular original table, which have photosensitivity characteristics of red (R), green (G), and blue (B), respectively, and each of which outputs 8-bit signals 0 to 255 after analog to digital conversion. The CCD sensors 210R, 210G, and 210B used in this embodiment are disposed by being spaced apart from each other by a certain distance. Therefore, spatial errors between signals from the CCD sensors 210R, 210G, and 210B are corrected by delay circuit 401R, 401G, and 401B having different delay times according to the distance.

A copyright code addition circuit 402 adds a copyright code as a first identification signal to an R signal from the CCD sensor 210R. The copyright code is added as electronic watermark information not easily recognizable with eye. Each of logarithmic converters 403, 404, and 405 is formed of a lookup table read-only memory (ROM) or random access memory (RAM), and converts a luminance signal into a density signal. A masking and under-color removal (UCR) circuit 406, not described in detail below, is arranged in a well-known manner to convert three input signals into magenta (M), cyan (C), yellow (Y), and black (Bk) signals. When an original is read one time, the masking and UCR circuit 406 outputs the signals in a surface-sequential manner by a predetermined bit length of, for example, eight bits.

A central processing unit (CPU) 450 outputs a CNO signal which is a 2-bit surface-sequential signal for controlling the order of four transfer operations, as shown below, by changing operating conditions of the masking and UCR circuit 406.

| CNO signal | Print Output |
|---|---|
| 0 | M |
| 1 | C |
| 2 | Y |
| 3 | Bk |

A spatial filter circuit 407 is arranged in a well-known manner to correct the spatial frequencies of the output signals. A density conversion circuit 408 corrects temperature characteristics of the printer unit 202. The density conversion circuit 408 is formed of a ROM or RAM similar to that of the logarithmic converters 403 to 405.

A machine number addition circuit 410 enables addition of a second identification signal to the copy output. The second identification signal is, for example, a machine number such as a serial number of the printer, and forms electronic watermark information in thin yellow on a recording medium in this embodiment. The electronic watermark information in the printed state is not easily recognizable with eye. In a case where the copying machine in a multi-color mode is put to a bad use, e.g., to copy a particular image such as an image of a bank note, the machine can be identified from this electronic watermark information.

The CPU 450 controls the image signal processing and scanning operation of the image scanner unit 201. A read-only memory (ROM) 451 stores a program for the CPU 450. A random access memory (RAM) 452 is used as a work area by the CPU 450. A CPU 460 controls the image signal processing and printing operation of the printer 202. A ROM 461 stores a program for the CPU 460. A RAM 462 is used as a work area by the CPU 460. The ROM 461 forms a computer readable recording medium in this embodiment. A semiconductor memory, an optical disc, an magneto-optical disc, a magnetic medium, or the like is used as ROM 461.

Figure 2:
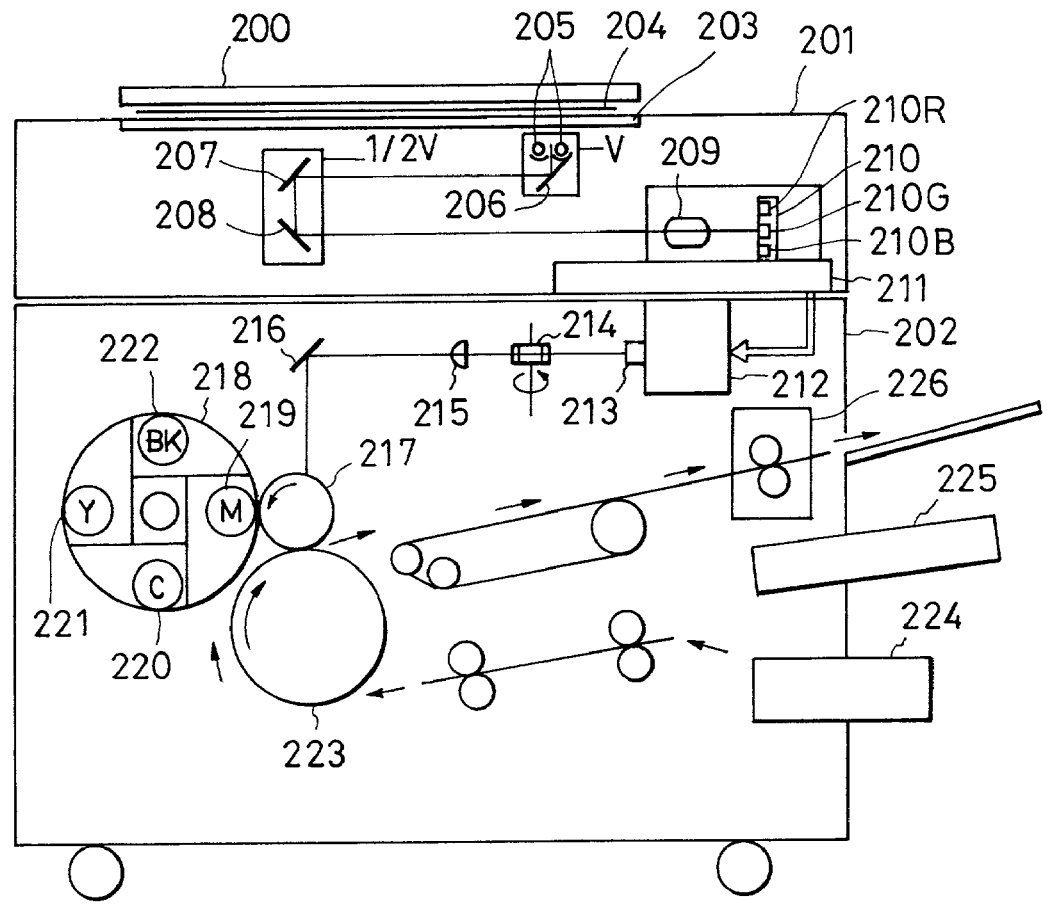
FIG. 2 is a diagram showing the construction of a copying machine which represents the first embodiment of the invention.

FIG. 2 schematically shows the construction of the copying machine. The image scanner unit 201 reads an original and processes a read signal in a digital signal processing manner. The printer unit 202 prints on a sheet of paper a multicolor image corresponding to the original image read by the image scanner unit 201.

In the image scanner unit 201, a mirror-surface pressure plate 200 presses an original 204 placed on an original support glass (hereinafter referred to as "platen") 203. Original 204 is irradiated with light form a lamp 205, and reflected light from original 204 is led by mirrors 206, 207, and 208 to be imaged on the three CCDs 210 by a lens 209. Signals obtained as multicolor information red (R), green (G), and blue (B) components from the CCDs 210 are supplied to a signal processing section 211. The lamp 205 and the mirror 206 are mechanically moved at a speed v in a direction perpendicular to the electrical scanning (main scanning) direction of the CCDs, and the mirrors 207 and 208 are moved at a speed of ½v in the same direction, thereby scanning the entire original surface (subscanning) and sending the signals to the signal processing section 211. The scanning in the subscanning direction is started in synchronization with a signal VSYNC described below and is performed based on a signal HSYNC (a sync signal output in one main scanning cycle) while the electrical scanning is started in synchronization with the HSYNC and is performed based on a signal CLK.

In the signal processing section 211, the read signals are temporarily stored in an image memory and thereafter electrically processed to be decomposed into magenta (M), cyan (C), yellow (Y), and black (Bk) components, which are sent to the printer unit 202. To read out image data read and stored by completing the process of scanning the original one time, reading is performed four times. One of the M, C, Y, and Bk components is formed and sent to the printer unit 202 by image processing following each cycle of reading. One printout is completed by performing reading and processing four times. Each of the image signals M, C, Y, and Bk sent from the image scanner unit 201 is supplied to a laser driver 212. The laser driver 212 drives a semiconductor laser device 213 by modulating the intensity or the lighting time of a drive signal with the density of the supplied image signal. A surface of a photosensitive drum 217 is scanned with laser light from the laser device 213, which is led to the photosensitive drum 217 by a polygon mirror 214, an f-θ lens 215, and a mirror 216.

A rotary development device 218 is constituted of a magenta development section 219, a cyan development section 220, a yellow development section 221, and a black development section 222. The four development sections are brought into contact with the photosensitive drum 217 one after another to develop, with toners, an electrostatic image formed on the photosensitive drum. A sheet of printing paper supplied from a paper cassette 224 or 225 is wrapped around a transfer drum 223, and the image developed on the photosensitive drum is transferred onto the printing paper.

After four colors M, C, Y, and Bk have been successively transferred in this manner, the printing paper is fed through a fixation unit 226 for fixation of the toners and is then expelled.

Three primary colors of light and three primary colors of coloring materials will now be described.

Figure 3:
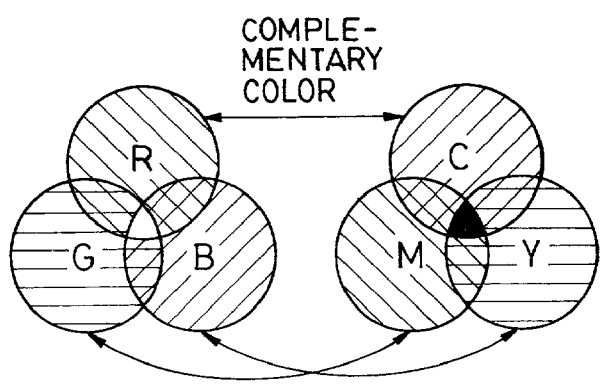
FIG. 3 is a diagram showing the relationship between three primary colors of light and three primary colors of a coloring material.

FIG. 3 shows the relationship between three primary colors of light and three primary colors of coloring materials.

Colors seen on a personal computer display or the like are produced by combining primary colors red, green and blue of light. A mixture of equal intensities of all these primary colors of light produces sensation of white. Multicolor printers express a color not by the three primary colors of light but by the same primary colors as those of oil or water colors or the like. The three primary colors of coloring materials are cyan, magenta and yellow and mixing equal amounts of these colors produces black. The three primary colors of light and the three primary colors of coloring materials are complementary with each other.

Figure 4:
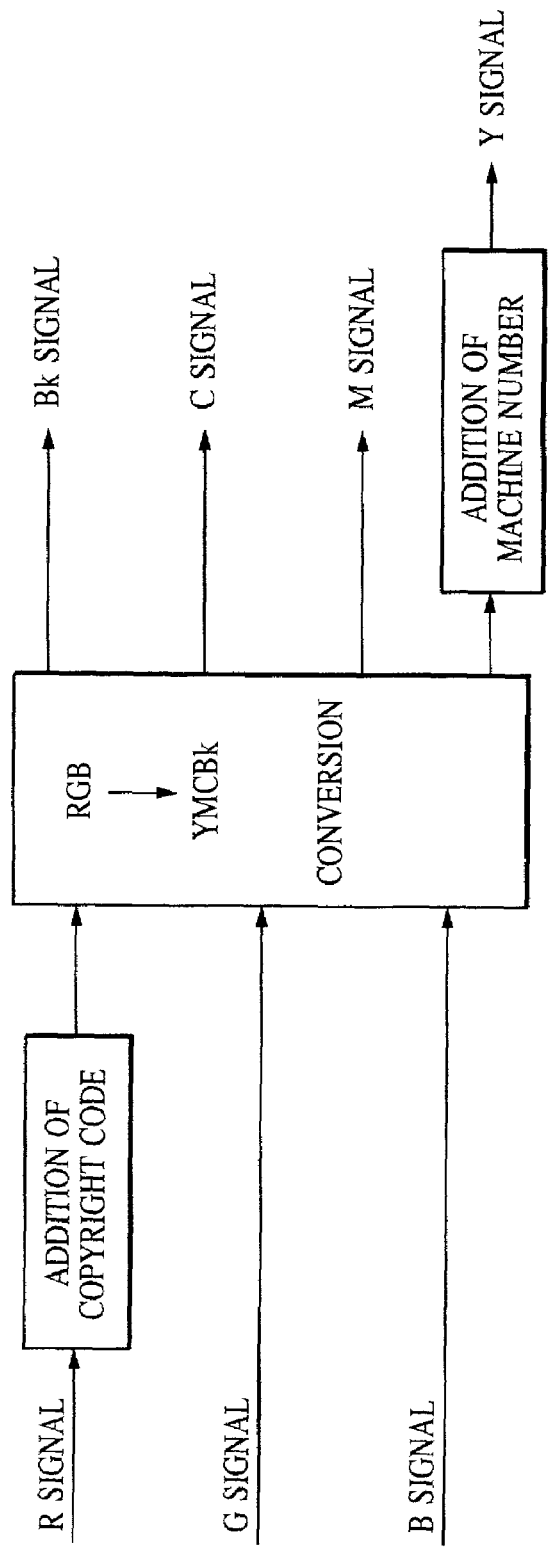
FIG. 4 is a block diagram of signal processing sections for adding information to input R, G, and B signals and for adding information to an output Y, M, C, and K signals.

The input B signal relates mainly to the Y signal. If the B signal contains electronic watermark information such as a copyright code, and if the machine number is added to a color print by modulating the Y signal, the electronic watermark information added to the B signal and converted into a Y signal component is disturbed. In the case where, as shown in FIGS. 1 and 4, the copyright code addition circuit 402 adds electronic watermark information such as a copyright code to one of the color component signals, e.g., the R signal different from the color signal to which a machine number is added, the C signal mainly reflects the electronic watermark information, as can be understood from FIG. 3. On the printer 202 side, therefore, after conversion of the R, G, and B signals into Y, M, C, and Bk signals, the machine number is added by modulating the Y signal, so that the influence of addition of this information is small. The copyright code and the machine number marked on the resulting print can easily be discriminated from each other since they have different color tones.

Figure 5:
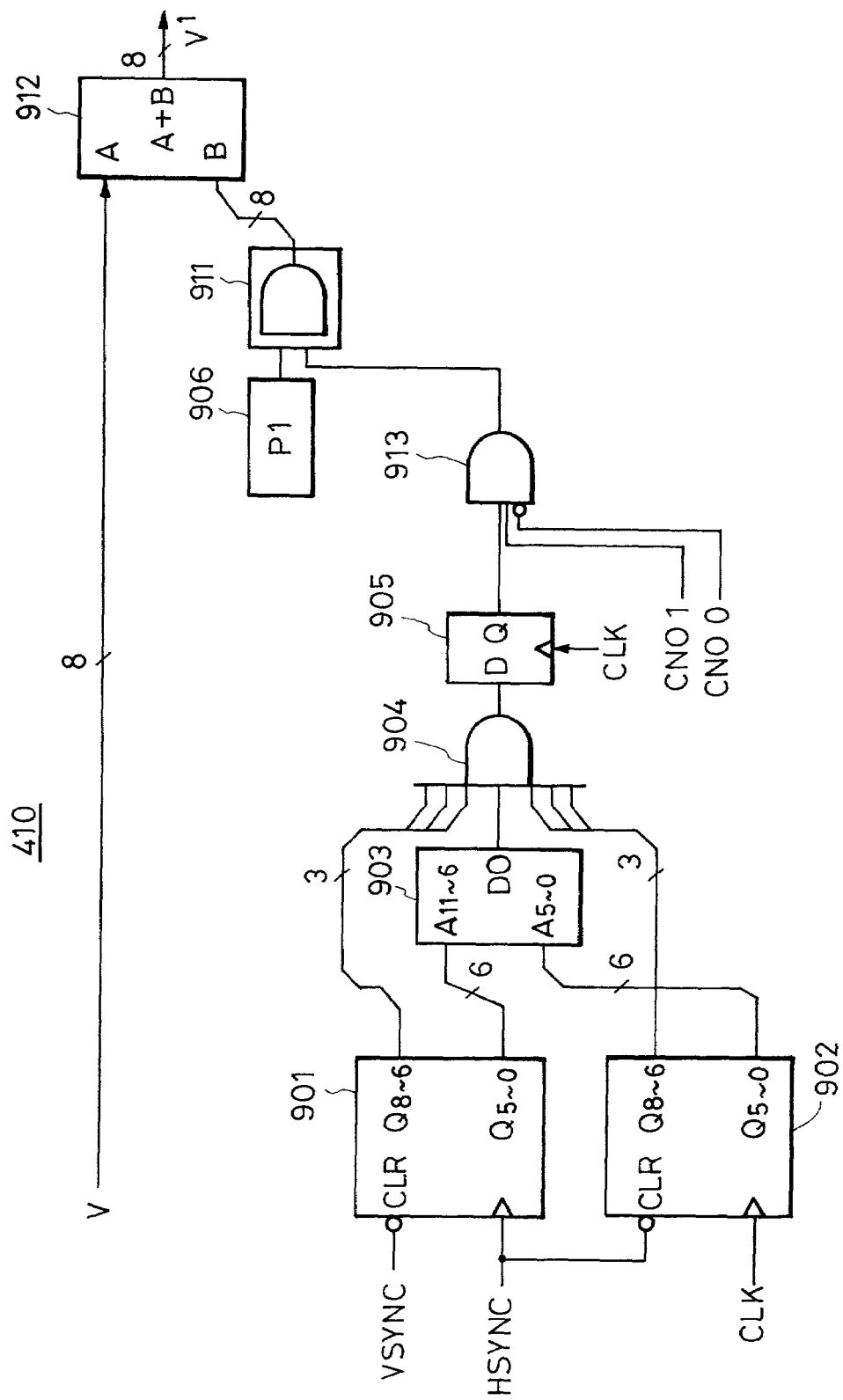
FIG. 5 is a block diagram showing the configuration of a machine number addition circuit in the first embodiment.

FIG. 5 is a block diagram showing the configuration of the machine number addition circuit 410. The machine number addition circuit 410 has a subscanning counter 901 and a main scanning counter 902. The subscanning counter 901 counts the above-mentioned HSYNC and has its count cleared in synchronization with the above-mentioned VSYNC. The main scanning counter 902 counts the pixel sync signal CLK and has its count cleared in synchronization with the HSYNC. The machine number addition circuit 410 also has a look-up table ROM (hereinafter referred to as "LUT") 903, an AND gate 904, a flip-flop 905, an AND gate 913, a register 906, an AND gate 911, and an adder 912.

The operation of this embodiment will now be described.

The subscanning counter 901 counts the main scanning sync signal HSYNC by a 9-bit length, and the main scanning counter 902 also counts the pixel sync signal CLK by a 9-bit length. Each of the subscanning counter 901 and the main scanning counter 902 counts in a cycle of 512. In other words, outputting values "1 to 511" from each counter is repeated. The LUT 903 is a read-only memory in which a pattern to be added (machine number) is stored. To the LUT 903, the lower six bits of the count value of each of the subscanning counter 901 and the main scanning counter 902 are input at a time as an input address. Only one bit output from the LUT 903 is referred to and the logical product of this bit and the upper three bits from each of the subscanning counter 901 and the main scanning counter 902 is obtained by the AND gate 904. This logical product is synchronized with the image signal V by the flip-flop 905 based on the CLK signal, and is logically combined with each of the two values "0" and "1" of the two-bit surface-sequential signal CNO by the AND gate 913. The output from the AND gate 913 is supplied to the AND gate 911. This signal is effective when CNO=2, that is, only when printing is performed in yellow.

A value P1, which designates the density of the image to be added, is previously held in the register 906. The logical product of the value P1 and the data from the AND gate 913 is obtained by the AND gate 911 and is added to the input signal V by the adder 912 to add the pattern held in the LUT 903. The addition result V' is output from the adder 912. Consequently, when CNO=2, i.e., when printing is performed in yellow, the pattern held in the LUT 903 is repeatedly read out and added to the signal V to be output. The additional pattern is added by using only a yellow toner to be difficult to recognize with human eye. This is a result of consideration of the fact that the discriminating power of the eye is weak with respect to a pattern depicted in a yellow toner.

Figure 6:
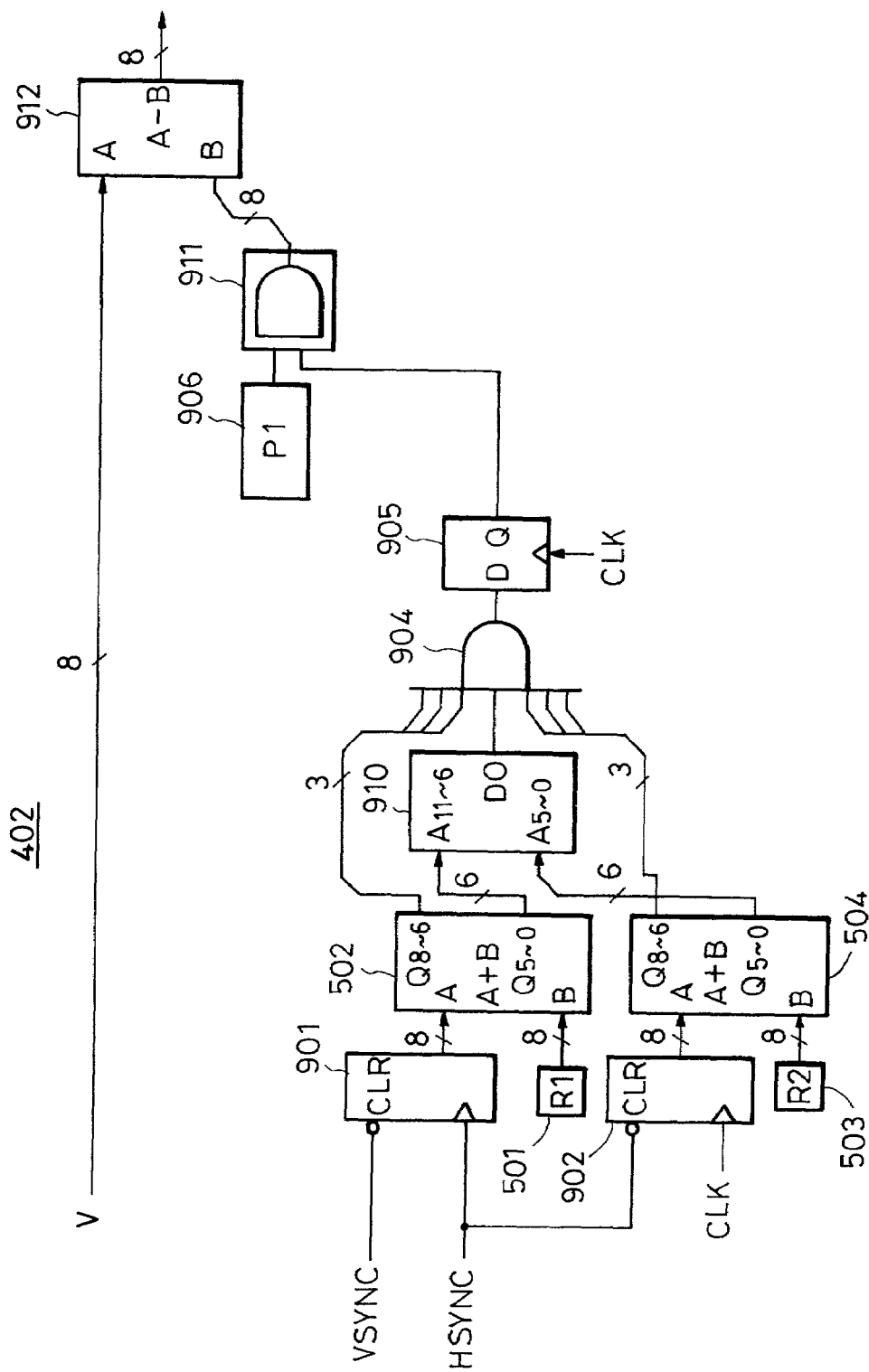
FIG. 6 is a block diagram showing the configuration of a copyright code addition circuit in the first embodiment.

FIG. 6 is a block diagram showing the configuration of an example of the copyright code addition circuit 402.

The configuration shown in FIG. 6 is generally the same as that shown in FIG. 5. However, a LUT 910 shown in FIG. 6 is a RAM to which data can be written from the CPU 450, and copyright codes are stored in the LUT 910. With respect to the copyright codes, control using the surface-sequential signal CNO is not performed.

The copyright code addition circuit 402 has adders 502 and 504, and registers 501 and 503 in which data is set by the CPU 450. The pattern addition position can be changed by setting suitable values in these registers such that the existence of the pattern is unnoticeable. That is, the position in the subscanning direction in which the copyright code is set can be changed by selecting the value set in the register 501, and the position in the main scanning direction can be changed by selecting the value set in the register 503. Setting of the values in the registers 501 and 503 is controlled so that the copyright code is added in a position different from the position at which the machine number will be added.

Figure 7:
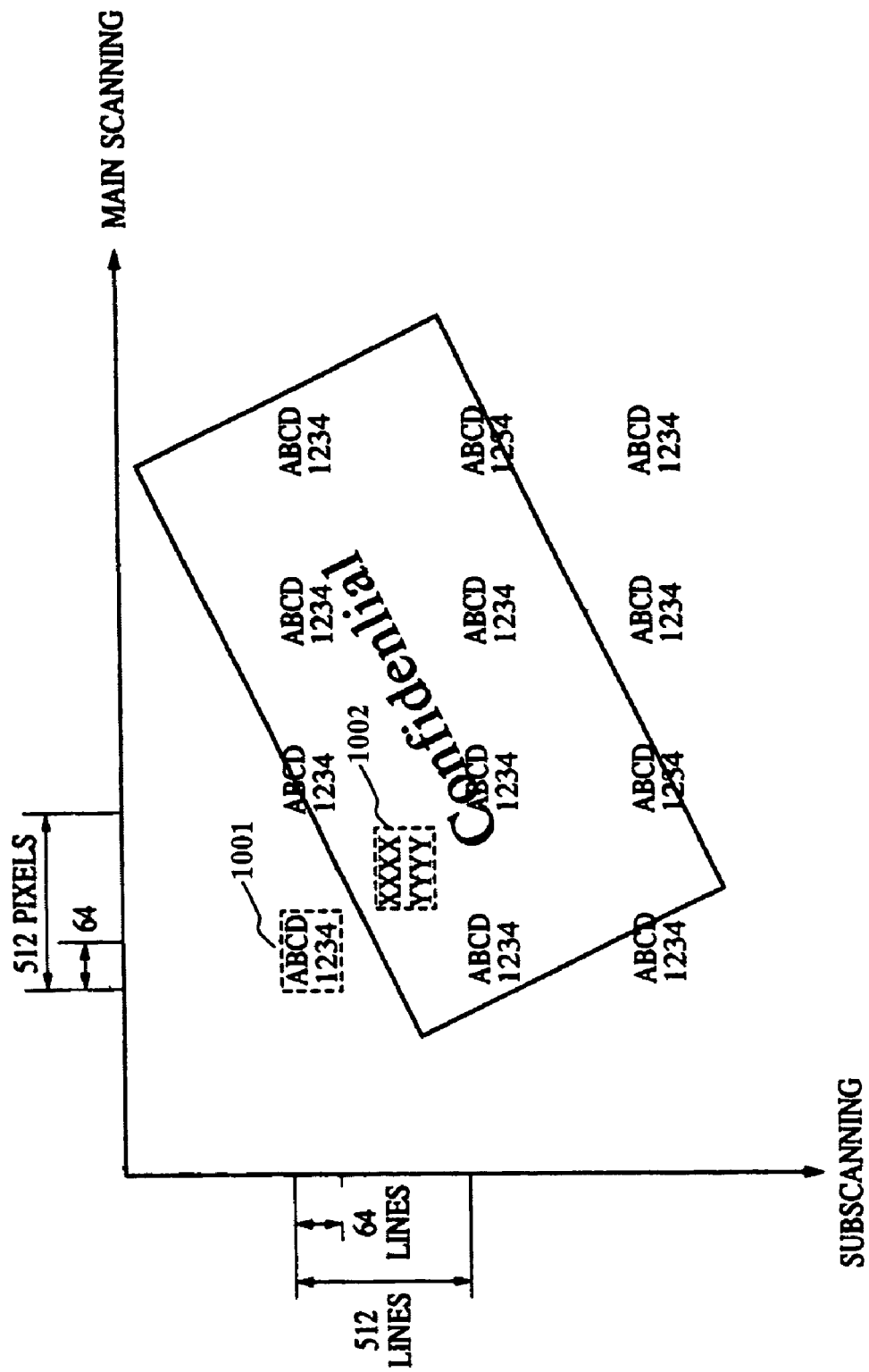
FIG. 7 is a diagram showing an example of copying in the first embodiment.

FIG. 7 illustrates a result of the copying process of this embodiment. Letters indicated by 1001 in FIG. 7 represent an added machine number pattern corresponding to the content of the LUT 903. Letters indicated by 1002 represent an added copyright code. In the example shown in FIG. 7, the pattern 1001 in which letters "ABCD" and "1234" are arranged in the subscanning direction is added as a pattern formed of 64×64 pixels such as to be difficult to discriminate with the human eye. The pattern 1001 is repeatedly added with a pitch of 512 pixels in the main scanning direction and with a pitch of 512 pixels in the subscanning direction. If a serial number or coded data of a serial number exclusively assigned to the copying machine is added as pattern 1001, the copying machine can be identified by examining the copy to which the pattern 1001 is added.

If the resolution is 400 dot/inch, the pitch with which the pattern 1001 is added and which corresponds to 512 pixels in the main scanning direction in this embodiment is about 32.5 mm. The length of the shorter side of the bank notes issued by the Bank of Japan is about 76 mm, and the bank notes of other major countries also have shorter-side lengths between about 60 to 120 mm. Therefore, if any of these bank notes is copied, the pattern 1001 can always be added within the area of the copy of the bank note. Even if only the bank note portion of the copy is cut out and used for an evil purpose, the machine number of the copying machine used to copy the bank note can be identified by examining the copy and reading the added pattern 1001.

A second embodiment of the present invention will next be described.

The first embodiment has been described with respect to an image processing system in which image data is transferred from an electronic apparatus to an image forming apparatus, and in which a color signal component for adding identification information by the image forming apparatus is made different from a color component for adding electronic watermark information such as a copyright code by the electronic apparatus.

In the second embodiment, the size of the block form of identification information added by an image forming apparatus and the size of the block form of identification information such as a copyright code added by an electronic apparatus are made different from each other to facilitate discrimination and recognition of each information.

FIGS. 8 to 11 illustrate the second embodiment.

Figure 8:
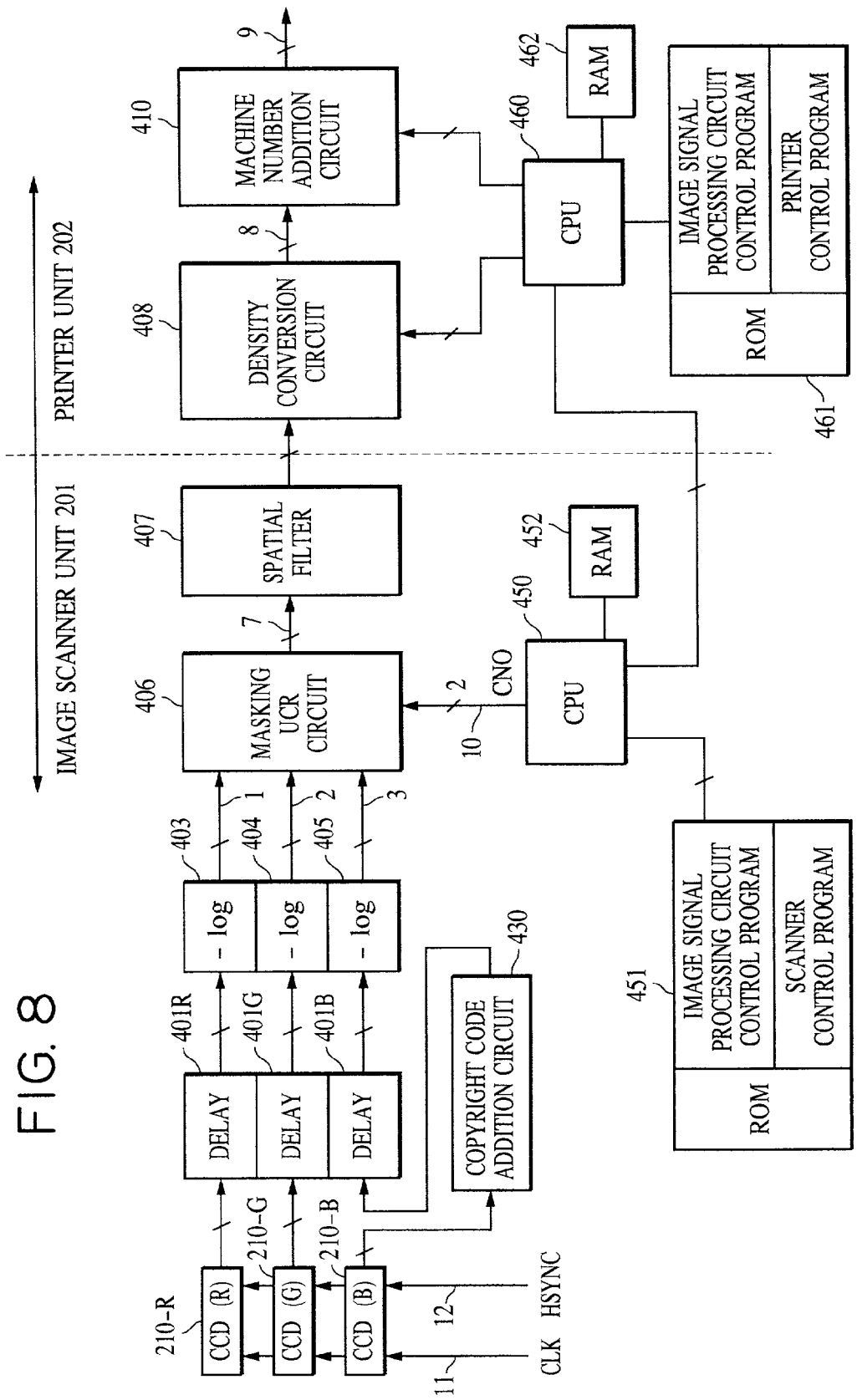
FIG. 8 is a block diagram showing the configuration of an image scanner unit and a printer unit of a second embodiment of the present invention.

Referring to FIG. 8, a copyright code addition circuit 430 is arranged to add a copyright code to the B signal. In this embodiment, the B signal is in a complementary relationship with the Y signal. A copyright code is added so as to form a yellow pattern in a print.

Figure 9:
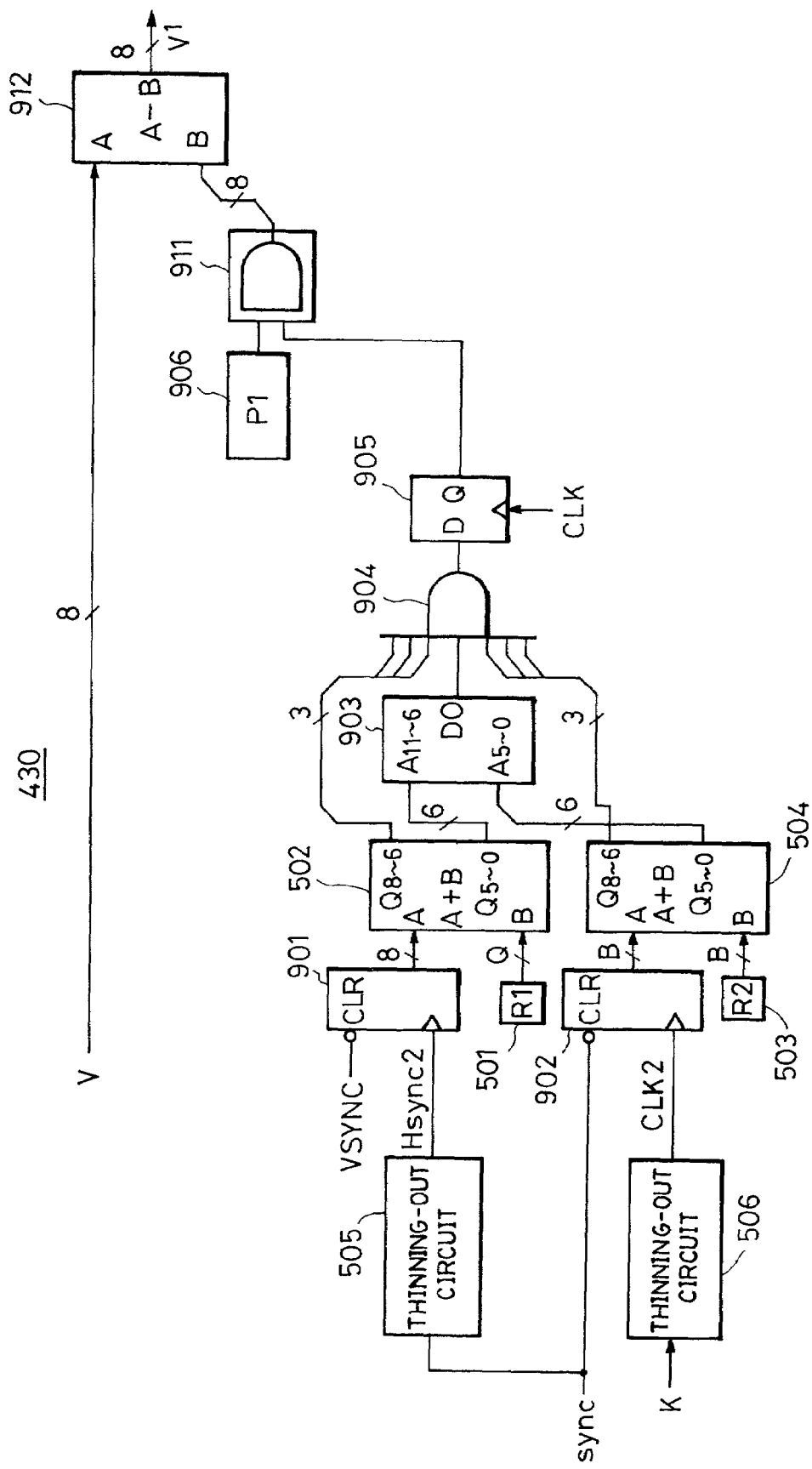
FIG. 9 is a block diagram showing the configuration of a copyright code addition circuit in the second embodiment.

FIG. 9 is a block diagram showing the configuration of the copyright code addition circuit 430. In FIG. 9, components corresponding to those shown in FIGS. 6 and 6 are indicated by the same reference characters.

Figure 10:
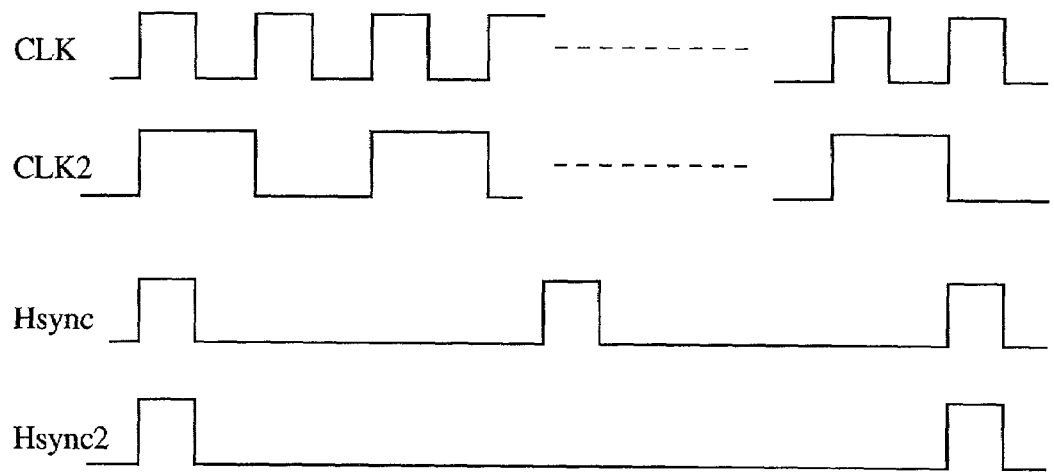
FIG. 10 is a timing chart of signals CLK2 and Hsync2 formed by thinning-out circuits.
Figure 11:
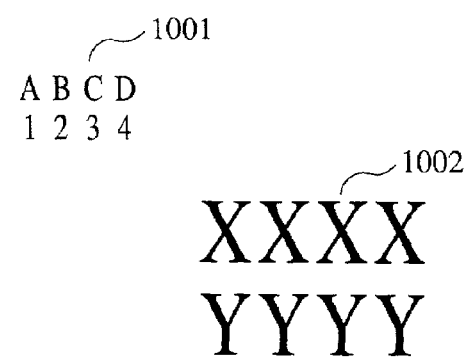
FIG. 11 is a diagram showing an example of copying in the second embodiment.

Thinning-out circuits 505 and 506 reduce the frequencies of signals Hsync and CLK to, for example, ½ to obtain Hsync2 and CLK2, respectively, as shown in FIG. 10, thereby doubling the block size of the copyright code 1002 added by the electronic apparatus relative to the block size of the machine number 1001 added by the image forming apparatus in the main scanning direction and in the subscanning direction.

In this embodiment, even if the image forming apparatus and the electronic apparatus which transfers image data to the image forming apparatus respectively add two items of identification information as the same color component, the block forms of the additional information items are made different in size from each other so that the two information items can be identified by being discriminated from each other. Needless to say, the identification information added by the image forming apparatus and the identification information added by the electronic apparatus may by added as different color components while their block forms are different in size from each other FIG. 12 is a block diagram showing a third embodiment of the present invention.

While each of the systems of the first and second embodiments is arranged to transfer image data from an image scanner to a printer, the system of the third embodiment is arranged to transfer image data from a computer to a printer.

Figure 12:
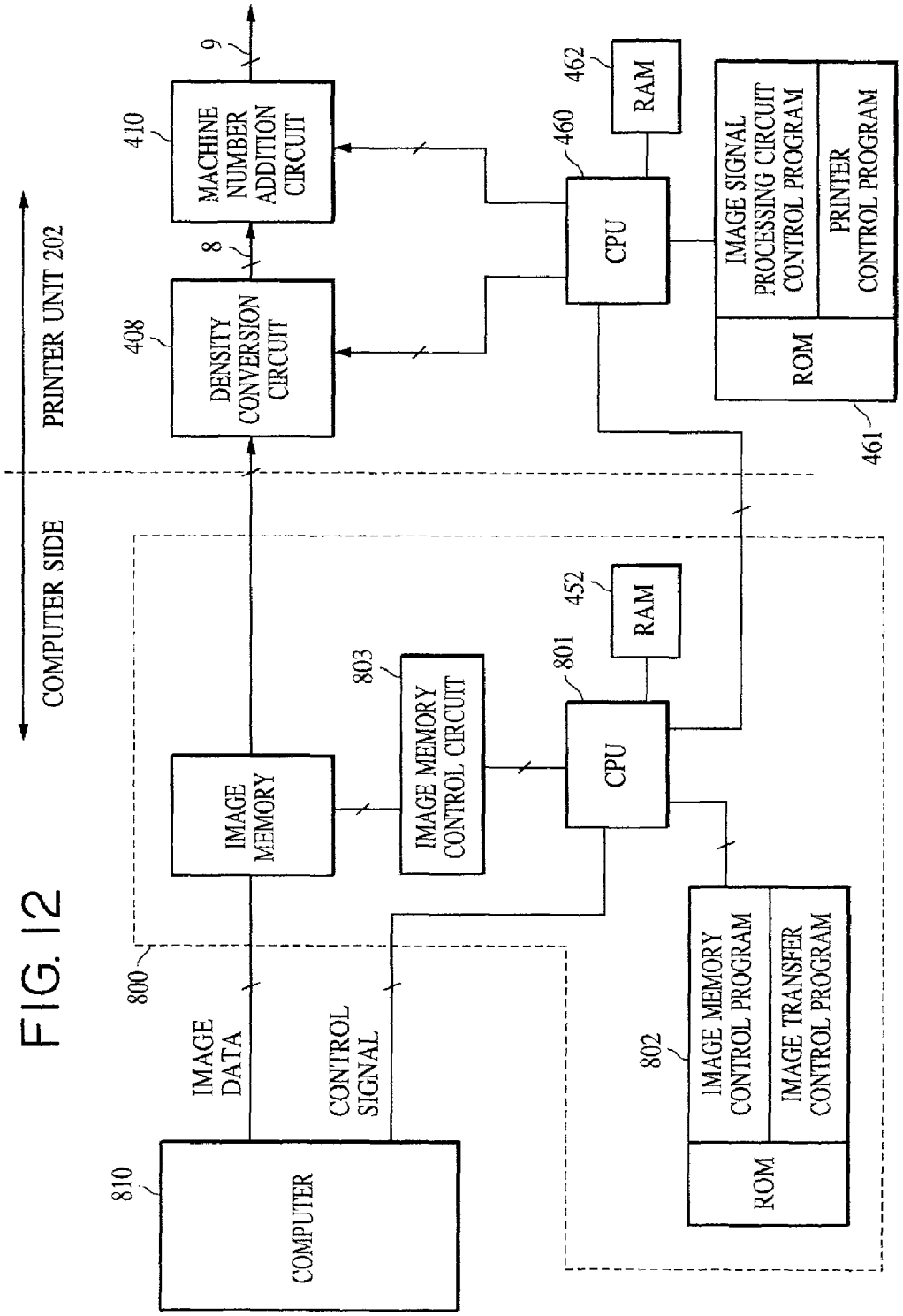
FIG. 12 is a block diagram showing the configuration of a computer and a printer unit of a third embodiment of the present invention.

Referring to FIG. 12, a unit 800 receives image data from a computer 810 and transfers the received data to a printer unit 202. A CPU 801 performs processing for marking an image with an electronic watermark information such as a machine number by controlling an image memory control circuit 803, and controls image transfer between the computer 800 and the printer unit 202. A ROM 802 stores a program for the CPU 801. The printer unit 202 has the same configuration as that shown in FIG. 1 or 8.

In the above-described embodiments, various information items are added. A modification of the process of adding information will now be described.

Figure 13:
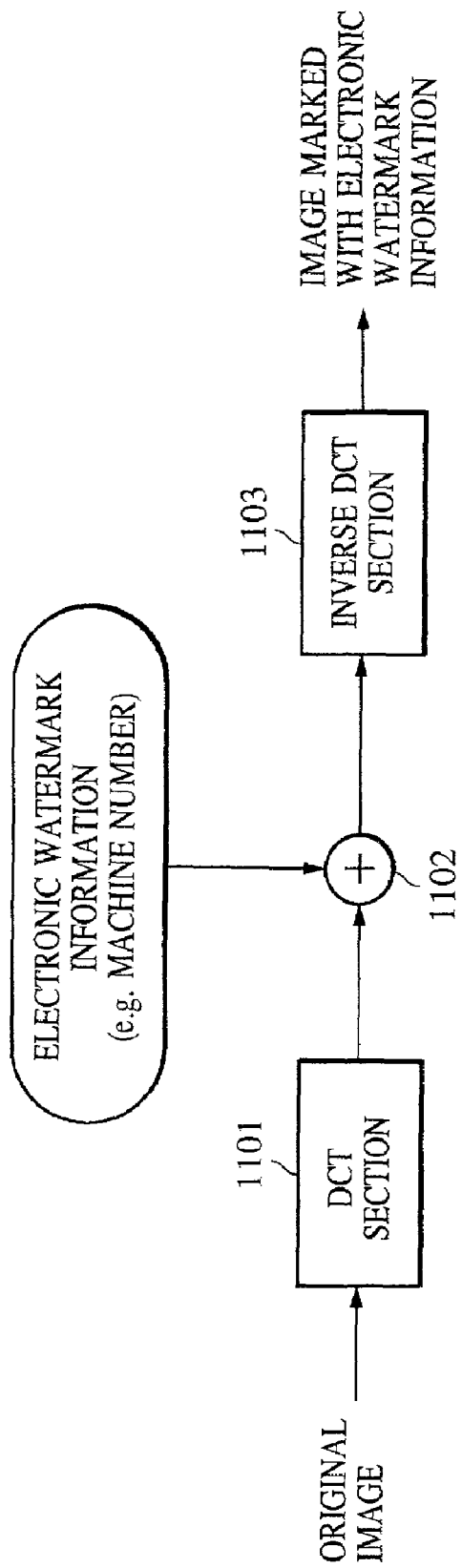
FIG. 13 is a block diagram for explaining processing for marking an image with electronic watermark information by using frequency conversion in the third embodiment.

FIG. 13 is a block diagram of a processing section for marking an image with electronic watermark information such as those in the described embodiments.

First, image data is converted into frequency components by a discrete cosine transform (DCT) section 1101. Next, watermark information of a machine number is set as a frequency component by an adder 1102. In this case, the watermark information is set at the boundary between a sensible region and an insensible region in the human perception. The frequency components with the set watermark information are then inversely transformed to restore the image data.

Thus, identification information is set by a method different from the method of using the identification information addition means on the printer 202 side, thereby facilitating discrimination between a machine number added by the printer unit 202 and a machine number added by the electronic apparatus which transmits data to the printer unit 202.

In the embodiments of the present invention, the electronic apparatus or the like may have a function for ascertaining whether the printer unit 202 has a function for adding identification information when the electronic apparatus transfers image data to the printer unit 202. If the printer unit 202 has no function for adding identification information, the electronic apparatus adds identification information. The embodiments have been described with respect to the case where a printer is used as an example of the image forming apparatus. However, any other image forming apparatus, e.g., a display may be used instead of the printer.

In the above described embodiments, a copyright code is produced by each of the copyright code circuits 402 and 430 shown in FIGS. 1 and 8. Such identification information for identification of a person who made an image may be input manually or by inserting a magnetic card or the like. In the case of the system shown in FIG. 12, a copyright code is produced by being input from the computer 810.

The method of adding identification information according to the present invention is not limited to those in the above-described embodiments, and other various addition methods are possible. Essentially, any method may suffice as long as electronic watermark information can be added in a discriminable state.

As described above, in the embodiments of the present invention, the system in which an item of identification information not easily recognizable with eye when displayed as electronic watermark information or the like is added to image data containing similar identification information is designed so that the two information items can easily be discriminated from each other. For example, when image data containing electronic watermark information such as a copyright code is printed by a printer having a function for adding a machine number, the two items of watermark information can be printed in a state of being discriminable from each other.

Such two identification information items may be obtained in a state of being different in color and/or block size such as to be easily discriminable from each other.

Even if two identification information items have the same color, they can be discriminated from each other. Even if an original image is printed by being marked with identification information, the visibility of identification information is low enough to impair the quality of the original image.

While the present invention has been described with respect to what presently are considered to be the preferred embodiments, it is to be understood that the invention is not limited to the described embodiment. To the contrary, the present invention is intended to cover various modifications and equivalent arrangements included within the spirit and the scope of the appended claims. The scope of the following claims is to be accorded the broadest interpretation so as to encompass all such modifications and equivalent structures and functions.

What is claimed is:

1. An image processing apparatus for adding information to image data, said apparatus comprising:
   first addition means for adding first identification information to a first color signal of the image data, wherein the first identification information is not easily recognizable by the human eye and relates to a copyright code;
   generating means for generating second identification information; and
   setting means for setting the second identification information in the image data containing the first identification information,
   wherein the second identification information is not easily recognizable by the human eye and is different in form from the first identification information, and
   said generating means comprises color conversion means for performing color conversion on the image data including the first identification information so that the first identification information in the color-converted image data is represented by a color-converted first color signal, and forming means for forming the second identification information by a second color signal different from the color-converted first color signal representing the first identification information in the color-converted image data.

2. An image processing apparatus according to claim 1, wherein the first identification information has a first block size, and said generating means forms the second identification information having a second block size.

3. An image processing apparatus according to claim 2, wherein said setting means sets the second identification information having the second block size in the color-converted image data that includes the color-converted first color signal.

4. An image processing apparatus according to claim 3, wherein each of the color-converted first color signal and second identification information is formed by a yellow signal.

5. An image processing apparatus according to claim 1, wherein the first identification information is formed by a signal for a thin color.

6. An image processing apparatus according to claim 1, wherein the first identification information is set as a frequency component of the image data.

7. An image processing method for adding information to image data, said method comprising:

a first addition step, of adding first identification information to a first color signal of the image data, wherein the first identification information is not easily recognizable by the human eye and relates to a copyright code;
a generating step, of generating second identification information; and
a setting step, of setting the second identification information in the image data containing the first identification information,
wherein the second identification information is not easily recognizable by the human eye and is different in form from the first identification information, and
said generating step performs color conversion on the image data including the first identification information so that the first identification information in the color-converted image data is represented by a color-converted first color signal, and forms the second identification information by a second color signal different from the color-converted first color signal representing the first identification information in the color-converted image data.

8. An image processing method according to claim 7, wherein the first identification information has a first block size, and said generating step forms the second identification information having a second block size.

9. An image processing method according to claim 8, wherein said setting step sets the second identification information having the second block size in the color-converted image data that includes the color-converted first color signal.

10. An image processing method according to claim 9, wherein each of the color-converted first color signal and second identification information is formed by a yellow signal.

11. An image processing method according to claim 7, wherein the first identification information is formed by a signal for a thin color.

12. An image processing method according to claim 7, wherein the first identification information is set as a frequency component of the image data.

13. A computer-readable storage medium storing a program for implementing an image processing method for adding information to image data, said program comprising:
   program code for a first addition step, of adding first identification information to a first color signal of the image data, wherein the first identification information is not easily recognizable by the human eye and relates to a copyright code;
   program code for a generating step, of generating second identification information; and
   program code for a setting step, of setting the second identification information in the image data containing the first identification information,
   wherein the second identification information is not easily recognizable by the human eye and is different in form from the first identification information, and
   said generating step performs color conversion processing on the image data including the first identification information so that the first identification information in the color-converted image data is represented by a color-converted first color signal, and forms the second identification information by a second color signal different from the color-converted first color signal representing the first identification information in the color-converted image data.

14. A computer-readable storage medium according to claim 13, wherein the first identification information has a first block size, and said generating step forms the second identification information having a second block size.

15. A computer-readable storage medium according to claim 14, wherein said setting step sets the second identification information having the second block size in the color-converted image data that includes the color-converted first color signal.

16. An image processing apparatus for adding information to image data, said apparatus comprising:
   first addition means for adding first identification information to a first color signal of the image data, wherein the first identification information is not easily recognizable by the human eye;
   generating means for generating second identification information; and
   setting means for setting the second identification information in the image data containing the first identification information,
   wherein the second identification information is not easily recognizable by the human eye and is different in form from first identification information, and
   said generating means comprises color conversion means for performing color conversion on the image data including the first identification information so that the first identification information in the color-converted image data is represented by a color-converted first color signal, and forming means for forming the second identification information by a second color signal different from the color-converted first color signal representing the first identification information in the color-converted image data.

17. An image processing apparatus according to claim 16, wherein the first identification information has a first block size, and said generating means forms the second identification information having a second block size.

18. An image processing apparatus according to claim 17, wherein said setting means sets the second identification information having the second block size in the color-converted image data that includes the color-converted first color signal.

19. An image processing apparatus according to claim 18, wherein each of the color-converted first color signal and second identification information is formed by a yellow signal.

20. An image processing apparatus according to claim 16, wherein the first identification information is formed by a signal for a thin color.

21. An image processing apparatus according to claim 16, wherein the first identification information is set as a frequency component of the image data.

22. A computer-readable storage medium storing a program for implementing an image processing method for adding information to image data, said program comprising:
   program code for a first addition step, of adding first identification information to a first color signal of the image data, wherein the first identification information is not easily recognizable by the human eye;
   program code for a generating step, of generating second identification information; and
   program code for a setting step, of setting the second identification information in the image data containing the first identification information,
   wherein the second identification information is not easily recognizable by the human eye and is different in form from the first identification information, and
   said generating step performs color conversion processing on the image data including the first identification information so that the first identification information in the color-converted image data is represented by a color-converted first color signal, and forms the second identification information by a second color signal different from the color-converted first color signal represented the first identification information in the color-converted image data.

23. A computer-readable storage medium according to claim 22, wherein the first identification information has a first block size, and said generating step forms the second identification information having a second block size.

24. A computer-readable storage medium according to claim 23, wherein said setting step sets the second identification information having the second block size in the color-converted image data that includes the color-converted first color signal.

25. An image processing method for adding information to image data, said method comprising:
   a first addition step, of adding first identification information to a first color signal of the image data, wherein the first identification information is not easily recognizable by the human eye;
   a generating step, of generating second identification information; and
   a setting step, of setting the second identification information in the image data containing the first identification information,
   wherein the second identification information is not easily recognizable by the human eye and is different in form from the first identification information, and
   said generating step performs color conversion processing on the image data including the first identification information so that the first identification information in the color-converted image data is represented by a color-converted first color signal, and forms the second identification information by a second color signal different from the color-converted first color signal representing the first identification information in the color-converted image data.

26. An image processing method according to claim 25, wherein the first identification information has a first block size, and said generating step forms the second identification information having a second block size.

27. An image processing method according to claim 26, wherein said setting step sets the second identification information having the second block size in the color-converted image data that includes the color-converted first color signal.

* * * * *

UNITED STATES PATENT AND TRADEMARK OFFICE
CERTIFICATE OF CORRECTION

| | | |
|---|---|---|
| PATENT NO. | : 7,058,196 B2 | |
| APPLICATION NO. | : 09/239013 | |
| DATED | : June 6, 2006 | |
| INVENTOR(S) | : Yoichi Takaragi | |

It is certified that error appears in the above-identified patent and that said Letters Patent is hereby corrected as shown below:

TITLE PAGE AT ITEM (*):
Notice, insert --This patent issued on a continued prosecution application filed under 37 CFR 1.53(d), and is subject to the twenty year patent term provisions of 35 U.S.C. 154 (a)(2).--.

SHEET NO. 6 of 11:
Figure 7, "Confidenlial" should read --Confidential--.

SHEET NO. 6 of 11:
Figure 13, "(e.g." should read --(e.g.,--.

COLUMN 1:
Line 67, "water mark" should read --watermark--.

COLUMN 4:
Line 30, "form" should read --from--.

COLUMN 7:
Line 59, "other" should read --other.--.

COLUMN 8:
Line 42, "above described" should read --above-described--.

COLUMN 9:
Line 13, "embodiment." should read --embodiments.--.

COLUMN 11:
Line 23, "from" should read --from the--.

UNITED STATES PATENT AND TRADEMARK OFFICE
CERTIFICATE OF CORRECTION

PATENT NO. : 7,058,196 B2
APPLICATION NO. : 09/239013
DATED : June 6, 2006
INVENTOR(S) : Yoichi Takaragi It is certified that error appears in the above-identified patent and that said Letters Patent is hereby corrected as shown below:

COLUMN 12:
Line 15, "represented" should read --representing--.

Signed and Sealed this

Second Day of January, 2007

JON W. DUDAS
*Director of the United States Patent and Trademark Office*